(12) United States Patent
Marolia

(10) Patent No.: US 7,844,964 B2
(45) Date of Patent: Nov. 30, 2010

(54) NETWORK FOR MASS DISTRIBUTION OF CONFIGURATION, FIRMWARE AND SOFTWARE UPDATES

(75) Inventor: Sunil Marolia, Dana Point, CA (US)

(73) Assignee: Hewlett Packard Development Company, L.P., Houston, TX (US)

( * ) Notice: Subject to any disclaimer, the term of this patent is extended or adjusted under 35 U.S.C. 154(b) by 878 days.

(21) Appl. No.: 11/226,032

(22) Filed: Sep. 14, 2005

(65) Prior Publication Data

US 2006/0010437 A1 Jan. 12, 2006

Related U.S. Application Data

(60) Provisional application No. 60/613,078, filed on Sep. 23, 2004.

(51) Int. Cl.
*G06F 9/44* (2006.01)
(52) U.S. Cl. .................. 717/172; 717/173; 717/177; 717/178; 455/418; 455/419
(58) Field of Classification Search ......... 717/168–178; 455/418–422.1
See application file for complete search history.

(56) References Cited

U.S. PATENT DOCUMENTS

| | | | |
|---|---|---|---|
| 6,345,288 B1 * | 2/2002 | Reed et al. ................ 709/201 |
| 6,549,770 B1 * | 4/2003 | Marran ..................... 455/419 |
| 6,643,506 B1 * | 11/2003 | Criss et al. ................ 455/419 |
| 6,928,468 B2 * | 8/2005 | Leermakers ............... 709/221 |
| 6,986,133 B2 * | 1/2006 | O'Brien et al. ............ 717/173 |
| 2002/0157089 A1 * | 10/2002 | Patel et al. ................ 717/178 |
| 2003/0182414 A1 * | 9/2003 | O'Neill ..................... 709/223 |

OTHER PUBLICATIONS

An approach to distributed component-based real-time application software development, Yau, S.S.; Bing Xia, Ille, 1998, pp. 275-283.*
Software reliability predictions for distributed software, Pant, H.; Jeske, D.R., IEEE, 1998, pp. 11-21.*
Experiment of component-based software development on multiple distributed object environments, Satoh, Y.; Yamashita, T.; Murayama, K.; Takahara, K.; Yasutake, Y.; Aoyama, M., IEEE, 1998, pp. 12-19.*

* cited by examiner

*Primary Examiner*—Wei Y Zhen
*Assistant Examiner*—Satish Rampuria

(57) ABSTRACT

A network for mass broadcast of update packages to electronic devices makes it possible to efficiently broadcast update packages for configuration, firmware and software updates. A broadcast server in the network employs broadcast means to broadcast update packages. An electronic device capable of receiving these broadcast update packages comprises a listening client that is capable of listening to a broadcast channel and downloading an update package broadcast by the broadcast server. The listening client makes use of a listening parameters that are set by the DM server in order to facilitate the download from the broadcast server.

10 Claims, 2 Drawing Sheets

NETWORK FOR MASS DISTRIBUTION OF CONFIGURATION, FIRMWARE AND SOFTWARE UPDATES

RELATED APPLICATIONS

The present application makes reference to, is a continuation of, and claims benefit of U.S. Provisional Patent Application 60/613,078 entitled "NETWORK FOR MASS DISTRIBUTION OF FIRMWARE AND SOFTWARE UPDATES", filed Sep. 23, 2004, the complete subject matter of which is hereby incorporated herein by reference, in its entirety.

The present application hereby makes reference to PCT Application with publication number WO/02/41147 A1, PCT number PCT/US01/44034, filed 19 Nov. 2001, and to provisional application 60/249,606 filed 17, Nov. 2000, both of which are incorporated by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. The software and firmware in electronic devices have bugs, and quite often, these bugs inhibit proper operation of the electronic device by a user.

Electronic devices, such as mobile phones and personal digital assistants (PDA's), often contain firmware and application software that are either provided by the manufacturers of the electronic devices, by telecommunication carriers, or by third parties. If firmware or firmware components are to be changed in electronic devices, it is often very tricky to update the firmware components. Particularly, any code of functions that is employed to update firmware or firmware components themselves may have to be changed or updated. Such code or functions, when upgraded, may not fit into the space available in the electronic device (FLASH or other storage). Changes to firmware or firmware components must be performed in a fault tolerant mode and fault tolerant code are not easy to implement.

Typically one device at a time will be updated. However, if an operator needs to update millions of phones, updating one device at a time could be slow. There is no easy way to conduct mass updates of millions of devices, such as mobile handsets. Establishing individual update sessions with millions of mobile devices is a slow and expensive proposition.

Support for determining a set of mobile handsets that may be targets of updates is often lacking. There are currently no easy techniques by which a mass update might be conducted. In addition, determining if these mass updates worked is also not possible.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or device supporting configuration, firmware and/or software update of mobile devices, wherein the download is conducted using broadcast means, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Aspects of the present invention relate generally to the process of conducting device management tasks, such as updating software/firmware in electronic devices, and more specifically, to mass update of mobile devices by a network, such as an operator network. The following discussion makes reference to the term "electronic device" that is used herein to refer to mobile electronic devices such as, for example, a mobile handset, a cellular phone, a personal digital assistant (PDA), a pager, and a personal computer, to name just a few. Although the listed example electronic devices are mobile devices, application of the present invention is not limited in this manner, as representative embodiments of the present invention may be employed in a wide variety of electronic devices, both fixed and mobile. The following discussion also makes reference to the term "network" that is used herein to refer to networks such as, for example, an operator network, an enterprise network, an Internet based network, a management network for a service, etc.

Electronic devices may be adapted to access servers to retrieve update information for updating memory in the electronic devices. An electronic device may be, for example, a mobile electronic device having firmware/software such as mobile cellular phone handsets, personal digital assistants (PDAs), pagers, MP-3 players, digital cameras, to name just a few. Update information may comprise information that modifies or changes firmware/software and/or software components installed in the electronic device. In a representative embodiment of the present invention, update information may comprise a set of executable instructions for converting a first version of code to an updated/second version of code. The update information may add new services to the electronic device, as desired by a service provider, device manufacturer, or an end-user, and/or may fix bugs (e.g., errors) in the operating code of the electronic device. In a representative embodiment of the present invention, update information may comprise an update package.

Figure 1:
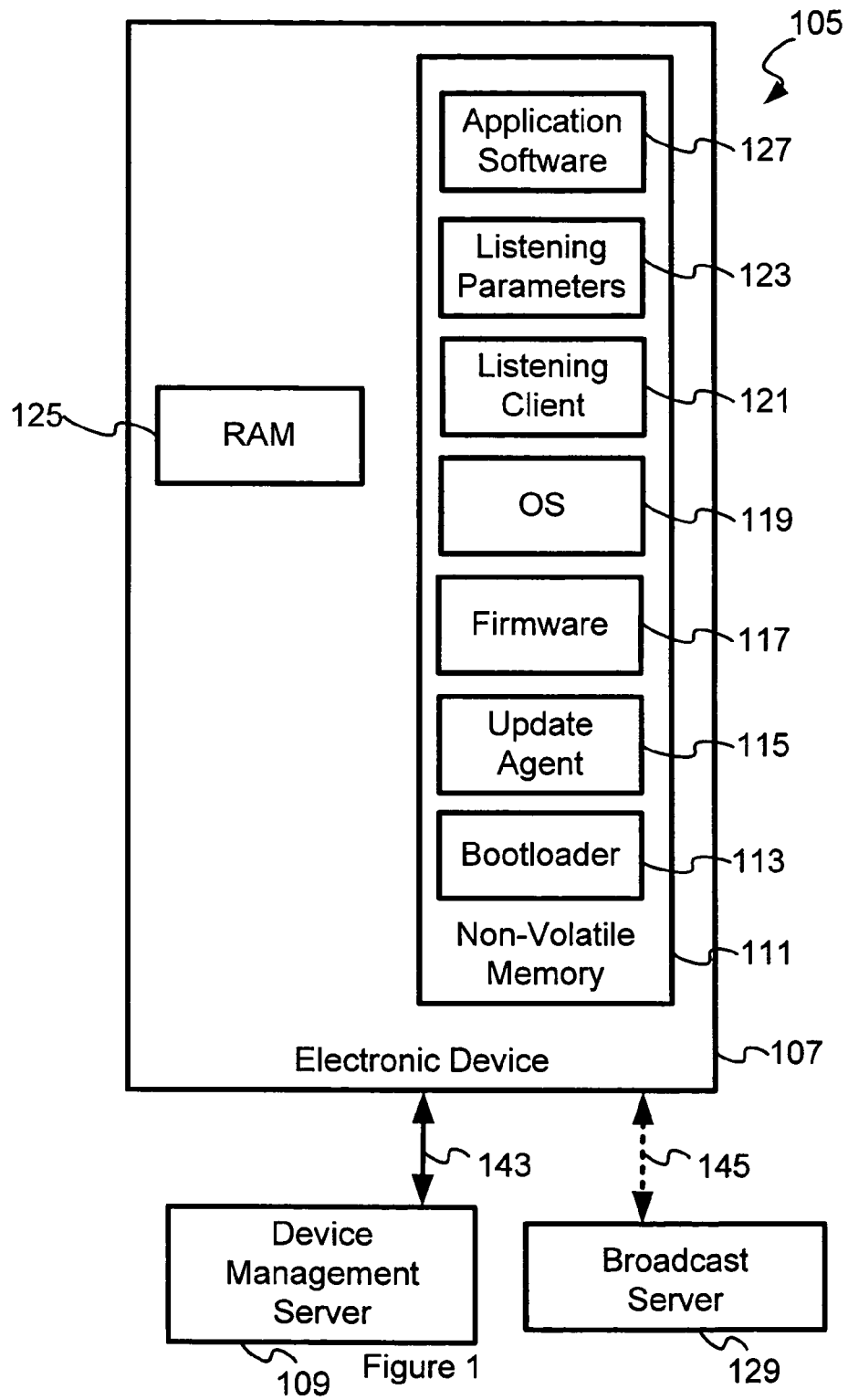
FIG. 1 is a perspective block diagram of a network for mass distribution of configuration, firmware and software updates that comprises a device management (DM) server, an electronic device and a broadcast server.

FIG. 1 is a perspective block diagram of a network 105 for mass distribution of configuration, firmware and software updates that comprises a device management (DM) server 109, an electronic device 107 and a broadcast server 129. The electronic device 107 is capable of updating an application software 127, an operating system (OS) 119, or a firmware 117 in the electronic device 107 employing an update package delivered by the broadcast server 129. The electronic device 107 is capable of applying updates using one or more update agents 115 that are each capable of processing update packages or subsets thereof. The electronic device 107 is also capable of updating configurations, such as email settings, MMS settings, Internet connectivity, etc.

The electronic device 107 also comprises a listening client 121 that is capable of listening to a broadcast channel and downloading an update package broadcast by the broadcast server 129. The listening client 121 makes use of a listening parameters 123 that are set by the DM server 109 in order to facilitate the download from the broadcast server 129, such as over a broadcast channel over which the broadcast server 129 is capable of broadcasting update packages and related information.

Thus, the network 105 supports mass distribution of firmware and software updates using "broadcast" methods that are employed by the broadcast server 129. The network 105 employs the OMA-DM protocol supported by the DM server 109, or other protocols, for device discovery. The OMA-DM server 109 uses an OMA-DM message comprising a 'Replace' command to set 'listening parameter(s)' 123, that will be used for the update package download. Using the 'listening parameter(s)', the 'listing client' 121 on the electronic device accepts or rejects meta-data packets that are broadcast to all electronic devices 107 using OTA means.

In one embodiment, the specific 'listening parameter(s)' provided by the DM server 109 are used by the listening client 121 to determine whether or not a broadcast packet is useful or not for that specific device. The listening client 121 in the electronic device 107 then receives one packet at a time from a broadcast communication means and re-assembles the packets using the meta-data wrapper of each packet in order to complete the download.

The method of downloading firmware and software updates using a broadcast means is useful for high-volume mass updates where the same data needs to be transmitted to many devices. It reduces network congestion by broadcasting once and allowing all 'provisioned' devices to accept the packets. This method is especially effective for performing background downloads during off-peak hours to reduce bandwidth costs.

The network 105 for mass broadcast of update packages to electronic devices makes it possible to efficiently broadcast update packages for firmware and software updates. The broadcast server 129 in the network 105 employs broadcast means to broadcast update packages. The electronic device 107 capable of receiving these broadcast update packages comprises the listening client 121 that is capable of listening to a broadcast update packages, such as over a broadcast channel, and downloading an update package broadcast by the broadcast server 129. The listening client 121 makes use of a listening parameters 123 that are set by the DM server 109 in order to facilitate the download from the broadcast server 129.

In one embodiment, the broadcast means employed by the broadcast server 129 and the corresponding listening client 121 is a multicast IP network.

In another embodiment, it is a the broadcast server employs an IP address that is typically used to indicate that an IP packet is an IP broadcast. The listening client is capable of treating these packets as IP broadcast.

In one embodiment the broadcast means employed by the broadcast server 129 is IP multicast. The network takes care of mapping IP multicast addresses to link-layer addresses that may have been specified through other means.

In one embodiment, the broadcast server 129 supports directed broadcast wherein a packet is sent to a specific network (or sub-network) or series of networks, and a flooded broadcast wherein a packet is sent to every network (or sub-network)

In one embodiment, the broadcast server 129 supports broadcast over RF networks, such as Burst mode traffic on a CDMA network.

In general, the listening client is capable of receiving broadcast update packages, retrieve them based on listening parameters set, ensure that the update packages received are not corrupt, and store them away for subsequent processing.

In one embodiment, the broadcast server 129 can employ one of several available broadcast means to communicate an update package to a plurality of electronic devices 107. In a related embodiment, the process of broadcasting update packages involves broadcasting a series of update packages, one after another, and letting a user select one of the update packages for an associated update (for example, for update from one version of firmware to another). In one embodiment, the location of the update packages, such as an URL, are broadcast and the devices can use the appropriate location for subsequent update activities. In another related embodiment, the device sends an OMA-DM based Alert 1226 message to the DM server after it receives a broadcasted update package, to indicate a successful or unsuccessful download (i.e. broadcast received), or a successful or unsuccessful update activity.

In one embodiment, a server for mass distribution of firmware and software updates to a plurality of mobile devices, that is a combination of a DM server 109 and a broadcast server 129, supports the mass updates of mobile devices 107. The server comprises a management protocol component for device discovery by a first protocol and a broadcast protocol component for communicating a package and an associated metadata via a broadcast mechanism to the plurality of devices. The associated metadata is such that each of the plurality of devices can accept or reject the package based on the associated metadata. The server employs the management protocol component to set or replace, as necessary, listening parameters in at least one of the plurality of devices. The listening parameters enable at least one of the plurality of mobile devices to determine if the package broadcast by the server is to be stored or consumed.

The server for mass distribution communicates the package to the plurality of mobile devices during an off-peak hour to reduce bandwidth costs. The server for mass distribution reduces congestion by broadcasting the package once and allowing each of the plurality of mobile devices capable of receiving the package to accept the package in order to conduct an update. In a related embodiment, the broadcast protocol component employs broadcast means based on a multicast IP network protocols to broadcast the package to the plurality of devices. In another related embodiment, the broadcast protocol component employs an IP broadcast protocols to communicate the package to the plurality of devices. Other broadcast means and multicast means are also contemplated.

In a different embodiment, an electronic device 107 capable of employing an update package for an update of the electronic device interacts with a server environment capable of updating mobile devices in a mass distribution mode. The electronic device comprises a non-volatile memory with firmware and software, and a listening client 121 that is capable of listening to a broadcast channel and downloading the update package broadcast by a broadcast server 129. It also comprises an update agent 115 this is capable of updating the electronic device. The listening client 121 makes use of a set of listening parameters 123 that are set by a DM server 109 in order to facilitate the download from the broadcast server 129, the DM server 109 communicatively coupled to the electronic device 107.

Figure 2:
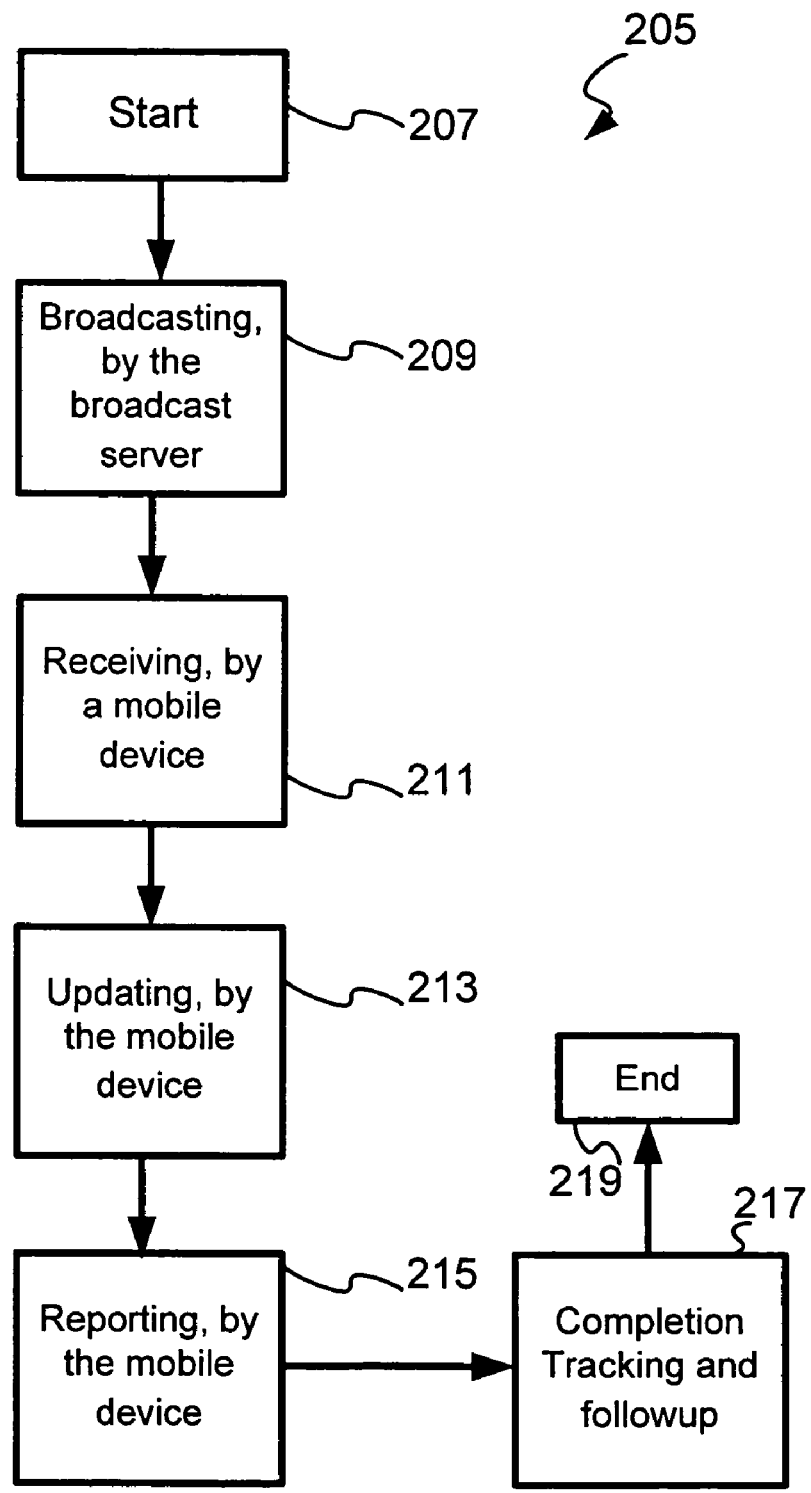
FIG. 2 is a flow chart for an exemplary method of updating a mobile device.

FIG. 2 is a flow chart for an exemplary method of updating a mobile device. At a block 207, the processing starts when a broadcast server is contacted by another server, such as a management server or a network operations console, to conduct a mass update of mobile devices, the mass updates comprising of, for example, configuration updates, software updates or firmware updates. Then, at a next block 209, the broadcast server broadcasts the update to multiple devices. In a related embodiment, it broadcasts only a notification of an update along with related information such as a URL of an update package that provides the update.

Then, at a next block 211, the mobile device receives the update package and validates it optionally, to verify that the update came from an authorized source. In a related embodiment, the mobile device employs a URL provided by a notification received at the block 209 to download an update package from the URL.

At a next block 213, the mobile device updates the firmware, software, configuration etc. using the update package. Then, at a next block 215, it reports back to a server, such as a management server or a network operations console, the success or failure of the update activity. Then, at a next block 217, the management server or a network operations console conducts completion tracking to keep track of mobile devices that were able to successfully complete the update and those that reported back errors. It also determines mobile devices that did not report back a result. It then, for a follow up, schedules additional notifications for delivery to those specific devices, such additional notifications being conducted using non-broadcast means of communication, such as a device management protocol or an SMS message sent to those devices. Finally, at the end block 219, the processing terminates.

Another method of updating a plurality of mobile devices, each capable of receiving an update package over a broadcast channel when communicatively coupled to a broadcast server, involves broadcasting by a server, receiving by mobile devices, updating by the mobile devices and subsequent reporting. Specifically, the method comprises broadcasting, by the broadcast server, an update package over a broadcast channel to the plurality of mobile devices and receiving, by the plurality of mobile devices the update package. It also comprises updating, by the plurality of mobile devices and reporting a result by the plurality of mobile devices. The updating further comprises provisioning each of the plurality of mobile devices to receive the update package over the broadcast channel. In addition, broadcasting further comprises packaging the update package into at least one of a plurality of packets, associating a metadata with the update package, and transmitting the metadata and the at least one of a plurality of packets.

The receiving process comprises the processing of the metadata to determine if at least one of a plurality of packets associated with the update package needs to be received, gathering at least one of a plurality of packets based on the metadata, and communicating, optionally, a notification to the broadcast server indicating the results.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A server for mass distribution of firmware and software updates to a plurality of mobile devices, the server comprising a processor and computer readable storage, the server further comprising:
   a management protocol component stored on the computer readable storage and executable by the processor for device discovery by a first protocol, the server employing the management protocol component to set or replace, as necessary, a listening parameter in at least one of the plurality of mobile devices;
   a broadcast protocol component stored on the computer readable storage and executable by the processor for communicating a package and associated metadata via a broadcast mechanism to the plurality of devices, wherein the package and associated metadata are communicated via a mass distribution over the broadcast mechanism from where each of the plurality of devices may receive the package from a single communication;
   wherein the associated metadata is such that each of the plurality of devices can accept or reject the package available to each of the plurality of devices via the broadcast mechanism based on the associated metadata; and
   wherein the listening parameter enables the at least one of the plurality of mobile devices to determine if the package broadcast by the server is to be stored or consumed.

2. The server for mass distribution in accordance with claim 1 wherein the listening parameter enables the at least one of the plurality of devices to accept or reject the package based on the associated metadata.

3. The server for mass distribution in accordance with claim 2 wherein the listening parameter enables each of the at least one of the plurality of devices to determine whether or not the package is useful and consumable.

4. The server for mass distribution in accordance with claim 3 wherein the package is communicated over a plurality of packets and wherein the plurality of devices can assemble the package after collecting the plurality of packets.

5. The server for mass distribution in accordance with claim 4 wherein each of the plurality of packets comprise a metadata wrapper that identifies the each of the plurality of packets and provides details on how it may be verified and consumed.

6. The server for mass distribution in accordance with claim 1 wherein the server communicates the package to the plurality of mobile devices during an off-peak hour to reduce bandwidth costs.

7. The server for mass distribution in accordance with claim 1 wherein the server reduces congestion by broadcasting the package once and allowing each of the plurality of devices capable of receiving the package to accept the package in order to conduct an update.

8. The server for mass distribution in accordance with claim 7 wherein the broadcast protocol component employs broadcast means based on a multicast IP network protocols to broadcast the package to the plurality of devices.

9. The server for mass distribution in accordance with claim 7 wherein the broadcast protocol component employs an IP broadcast protocols to communicate the package to the plurality of devices.

10. The server for mass distribution in accordance with claim 7 wherein the broadcast protocol component is embodied in broadcast server communicatively coupled to the server, wherein the broadcast server supports directed broadcast in which the package is sent to a specific network associated with the plurality of devices.

* * * * *

UNITED STATES PATENT AND TRADEMARK OFFICE
CERTIFICATE OF CORRECTION

PATENT NO.       : 7,844,964 B2                                   Page 1 of 1
APPLICATION NO.  : 11/226032
DATED            : November 30, 2010
INVENTOR(S)      : Sunil Marolia It is certified that error appears in the above-identified patent and that said Letters Patent is hereby corrected as shown below:

On the Cover page, item (73), Assignee, in column 1, line 1,
    delete "Hewlett Packard" and insert -- Hewlett-Packard --, therefor.

Signed and Sealed this

Twenty-fourth Day of May, 2011

David J. Kappos
*Director of the United States Patent and Trademark Office*